United States Patent [19]

Ide et al.

[11] Patent Number: 5,769,402

[45] Date of Patent: Jun. 23, 1998

[54] FLUID-FILLED ELASTIC MOUNT HAVING ORIFICE PASSAGES TUNED TO DAMP INPUT VIBRATIONS IN RESPECTIVE DIFFERENT FREQUENCY RANGES

[75] Inventors: Akiyoshi Ide, Komaki; Katsuhiko Katagiri, Ichinomiya, both of Japan

[73] Assignee: Tokai Rubber Industries, Ltd., Japan

[21] Appl. No.: 862,300

[22] Filed: May 22, 1997

[30] Foreign Application Priority Data

May 23, 1996 [JP] Japan ..................................... 8-128224

[51] Int. Cl.⁶ .................................................. F16F 13/00
[52] U.S. Cl. ................................ 267/140.14; 267/140.15
[58] Field of Search ........................ 267/140.11, 140.13, 267/140.14, 140.15, 219, 220; 248/636

[56] References Cited

U.S. PATENT DOCUMENTS

| | | | |
|---|---|---|---|
| 5,215,293 | 6/1993 | Muramatsu et al. | 267/140.14 |
| 5,437,437 | 8/1995 | Takano et al. | 267/140.14 |
| 5,547,173 | 8/1996 | Tsutsumida et al. | 267/140.14 |
| 5,620,168 | 4/1997 | Ohtake et al. | 267/140.14 |

FOREIGN PATENT DOCUMENTS

| | | |
|---|---|---|
| 60-245848 | 12/1985 | Japan . |
| 2-53541 | 4/1990 | Japan . |
| 5-40638 | 6/1993 | Japan . |

*Primary Examiner*—Matthew C. Graham
*Attorney, Agent, or Firm*—Parkhurst & Wendel, L.L.P.

[57] ABSTRACT

A fluid-filled elastic mount including an elastic body elastically connecting first and second mounting members and partially defining a pressure-receiving chamber filled with a fluid, a flexible diaphragm partially defining an equilibrium chamber filled with the fluid and displaceable to permit a volume change of the equilibrium chamber, a first orifice passage for fluid communication between the two chambers, a movable member disposed between the two chambers and displaceable or deformable to permit relative volume changes of the two chambers, a second and a third orifice passage formed between the movable member and one of the two chambers for permitting the fluid to flow therethrough based on displacement or deformation of the movable member. The second orifice passage is tuned to a frequency range higher than that of the first orifice passage while the third orifice passage is tuned to a frequency range higher than that of the second orifice passage, and a control device for permitting or inhibiting fluid flows through the third orifice passage.

15 Claims, 5 Drawing Sheets

FLUID-FILLED ELASTIC MOUNT HAVING ORIFICE PASSAGES TUNED TO DAMP INPUT VIBRATIONS IN RESPECTIVE DIFFERENT FREQUENCY RANGES

The present invention is based on Japanese Patent Application No. 8-128224 filed May 23, 1996, the content of which is incorporated hereinto by reference.

BACKGROUND OF THE INVENTION

1. Field of the Art

The present invention relates to a fluid-filled elastic mount which exhibits vibration damping and isolating characteristics based on flows of a fluid contained therein, and which elastic mount is suitably used as an engine mount adapted to mount a power unit of a motor vehicle on a suitable support member of the vehicle in a vibration damping manner. More particularly, the invention is concerned with such a fluid-filled elastic mount which is capable of providing different vibration damping and isolating characteristics by changing operating states of three orifices tuned to respective frequency ranges.

2. Discussion of the Related Art

As one type of a vibration damper interposed between two members of a vibration damping system, there is known a fluid-filled elastic mount which includes a first and a second mounting member elastically connected to each other by an elastic body, a pressure-receiving chamber which is partially defined by the elastic body and which receives vibrations applied to the elastic mount, a variable-volume equilibrium chamber which is partially defined by a flexible diaphragm and whose volume is variable by displacement of the flexible diaphragm. The pressure-receiving and equilibrium chambers are filled with a suitable non-compressible fluid, and communicate with each other by a first orifice passage. The elastic mount further has a movable member disposed between the pressure-receiving and equilibrium chambers such that the movable member is displaceable or deformable by a predetermined amount. The elastic mount permits relative volume changes of the pressure-receiving and equilibrium chambers based on the displacement or deformation of the movable member. This type of fluid-filled elastic mount is capable of exhibiting a high damping or isolating effect with respect to vibrations applied between the first and second mounting members, based on flows or resonance of the fluid which is forced to flow through the first orifice passage, while reducing or eliminating, based on the displacement or deformation of the movable member, a considerable increase in the dynamic spring constant upon application of the vibration in a high frequency range where the first orifice passage is substantially closed. Thus, the fluid-filled elastic mount constructed as described above is suitably used as an engine mount for a motor vehicle, for instance.

Generally, the elastic mount such as the engine mount is required to exhibit different damping or isolating characteristics depending upon the type of the input vibrations having different frequency values and amplitudes. For instance, the engine mount for the motor vehicle is required to exhibit damping effects with respect to the medium-frequency vibrations of several tens of Hz such as idling vibrations applied to the engine mount during the idling of the vehicle while the vehicle is in a stop with the engine in an idling state. At the same time, the engine mount is required to exhibit damping effects with respect to the low-frequency vibrations such as engine shakes, and the high-frequency vibrations such as booming noise, which low-frequency and high-frequency vibrations are applied to the engine mount during running of the vehicle.

To meet the requirements as described above, a publication No. 5-40638 of Japanese Utility Model application discloses an elastic mount including a second orifice passage which permits a fluid communication between the pressure-receiving and equilibrium chambers therethrough and which is formed in parallel with the first orifice passage, and a third orifice passage formed between the movable member and the equilibrium chamber. In this elastic mount, the second orifice passage is tuned to the frequency range which is higher than the frequency range to which the first orifice passage is tuned while the third orifice passage is tuned to the frequency range which is higher than the frequency range to which the second orifice passage is tuned. The second and third orifice passages are selectively controlled to be operative for the fluid communication between the two chambers by means of a switching valve. That is, when the second orifice passage is closed by the switching valve for inhibiting the fluid communication therethrough, the third orifice passage is rendered operative by the switching valve for permitting the fluid communication therethrough, so as to provide the damping effect with respect to the engine shakes based on the fluid flows through the first orifice passage as well as the damping effect with respect to the engine booming noises based on the fluid flows through the third orifice passage. When the third orifice passage is closed by the switching valve for inhibiting the fluid communication therethrough, the second orifice passage is rendered operative by the switching valve for permitting the fluid communication therethrough, so as to assure the damping effect with respect to the engine idling vibrations based on the fluid flows through the second orifice passage.

In view of a recently increasing requirement for improved smooth running stability of the vehicle, there has been a demand for further improved damping or isolating characteristics of the engine mount. In particular, the engine mount is required to exhibit significantly improved damping or isolating characteristics with respect to the engine idling vibrations in order to minimize the vibrations and noise while the vehicle is stationary with the engine placed in its idling state.

SUMMARY OF THE INVENTION

It is therefore an object of the present invention to provide a fluid-filled elastic mount having a novel structure, which elastic mount is capable of exhibiting excellent damping and isolating effects with respect to the input vibrations over a wide frequency range, and suitably used as an engine mount for a motor vehicle for assuring excellent damping and isolating effects with respect to engine shakes and booming noises generated during running of the vehicle while, at the same time, exhibiting improved damping or isolating effects with respect to engine idling vibrations generated while the vehicle is in a stop with the engine placed in its idling state.

The above object may be achieved according to the principle of the present invention, which provides a fluid-filled elastic mount comprising: a first and a second mounting member which are spaced apart from each other; an elastic body elastically connecting the first and second mounting members and partially defining a pressure-receiving chamber which receives an input vibrational load and which is filled with a non-compressible fluid; a flexible diaphragm which partially defines an equilibrium chamber filled with the fluid, the flexible diaphragm being displaceable to permit a change in volume of the equilibrium chamber; means for defining a first orifice passage for effecting fluid communication between the pressure-receiving and equilibrium chambers, the first orifice passage being tuned to a first frequency range; a movable member disposed between the pressure-receiving and the equilibrium chambers, the movable member being displaceable or deformable so as to permit relative volume changes of the pressure-receiving and the equilibrium chambers; means for defining a second orifice passage and a third orifice passage formed between the movable member and one of the pressure-receiving and the equilibrium chambers for permitting fluid flows therethrough based on displacement or deformation of the movable member, the second orifice passage being tuned to a second frequency range which is higher than the first frequency range while the third orifice passage is tuned to a third frequency range which is higher than the second frequency range; and first control means for permitting or inhibiting the fluid flows through the third orifice passage.

The fluid-filled elastic mount constructed as described above is capable of exhibiting effective damping characteristics based on the fluid flows through the first orifice passage as well as excellent damping characteristics based on the fluid flows through the third orifice passage when the third orifice passage is open for permitting the fluid communication therethrough. Further, when the third orifice passage is closed for inhibiting the fluid communication therethrough, the elastic mount exhibits effective damping characteristics based on the fluid flows through the second orifice passage as well as excellent damping characteristics based on the fluid flows through the first orifice passage. In other words, the first, second and third orifice passages are tuned to respective frequency ranges by adjusting the cross sectional area and length of each orifice passage. The second orifice passage which is tuned to a middle frequency range has a smaller fluid flow resistance than the first orifice passage which is tuned to a low frequency range. The third orifice passage which is tuned to a high frequency range has a further smaller fluid flow resistance than the second orifice passage. Further, the amounts of the fluid flowing through the second and third orifice passages are respectively restricted by the movable member. Accordingly, while all of the first, second and third orifice passages are open, the fluid is forced to flow through the third orifice passage having the smallest fluid flow resistance as well as through the first orifice passage in which the amount of flow of the fluid is not restricted. On the other hand, while the third orifice passage is closed and the first and second orifice passages are open, the fluid is forced to flow through the second orifice passage having a smaller fluid flow resistance than the first orifice passage as well as through the first orifice passage in which the amount of flow of the fluid is not restricted.

The movable member disposed between the pressure-receiving and equilibrium chambers may have any known structure provided that it limits the amount of the fluid flows between the pressure-receiving and equilibrium chambers while it permits relative volume changes of the two chambers so as to allow substantive fluid flows therebetween by a predetermined amount. For instance, the movable member may be in the form of a movable plate which permits relative volume changes of the pressure-receiving and equilibrium chambers on the basis of displacement thereof, or a flexible plate which permits relative volume changes of the two chambers on the basis of deformation thereof.

In a first preferred form of the invention, the fluid-filled elastic mount further comprises second control means for inhibiting fluid flows through the second orifice passage when the first control means permits the fluid flows through the third orifice passage, while the second control means permits the fluid flows through the second orifice passage when the first control means inhibits the fluid flows through the third orifice passage.

According to the arrangement as described above, the second orifice passage is controlled to be inoperative by the second control means while the third orifice passage is open for permitting the fluid communication therethrough, to thereby stably assure sufficient amounts of the fluid flows through the third and first orifice passages. Thus, the present elastic mount exhibits excellent damping and isolating characteristics based on the fluid flows through the first and third orifice passages when the second orifice passage is closed.

In a second preferred form of the invention, the fluid-filled elastic mount is used as an engine mount for a motor vehicle which is interposed between a power unit of the vehicle including an internal combustion engine and a support member of the vehicle such that the power unit is supported by the support member via the engine mount in a vibration damping manner, the second and first orifice passages being tuned to damp respective different components of engine idling vibrations of the power unit, such that a component of the engine idling vibrations whose vibration level is the highest is damped by the fluid flows through the second orifice passage and such that another component of the engine idling vibrations whose vibration level is smaller than that of the component of the engine idling vibrations damped by the fluid flows through the second orifice passage is damped by the fluid flows through the first orifice passage.

In the conventional engine mount, the orifice passage is tuned so that the engine mount exhibits a desired damping characteristic with respect to the engine idling vibration in a specific frequency range in which the vibration level is the highest. In other words, the conventional engine mount is designed so as to adjust or damp exclusively the component of the engine idling vibrations whose vibration level is the highest. However, a study made by the inventors of the present inventions revealed that the conventional engine mount designed as described above is not satisfactory in order to meet the demand for highly improved damping characteristics with respect to the engine idling vibrations, for satisfying the requirement for improved running stability of the vehicle. Further, it was found that the elastic mount is required to exhibit the vibration damping capability with respect to different components of the input vibrations which may arise depending upon the engine type of the vehicle, as well as the component of the input vibrations whose vibration level is the highest.

In view of the above, the elastic mount constructed according to the above second preferred form of the present invention is capable of adjusting or damping not only the component of the engine idling vibrations whose vibration level is the highest, but also the other component or components, to thereby exhibit a considerably high damping or isolating effect over a wider frequency range of the engine idling vibrations, based on the fluid flows through the first and second orifice passages.

The different components of the engine idling vibrations correspond to different ratios of the vibration frequency with respect to the rotating speed of the crankshaft of the engine. Preferably, the first and second orifice passages are tuned to adjust the respective different components of the engine idling vibrations whose vibration levels are the highest and the second highest. More specifically described, the first and second orifice passages are desirably tuned to adjust the second-order component and the first- or fourth-order component of the idling vibrations generated by an in-line 4-cylinder engine, or the third-order and the 1.5th-or sixth-order component of the idling vibrations generated by a v-type 6-cylinder engine. The tuning of the orifice passages may be advantageously effected by adjusting the length and cross sectional area of each orifice passage so as to permit the elastic mount to exhibit a low dynamic spring constant in the intended frequency ranges of the input vibrations to be damped based on the fluid flowing through the orifice passages while taking account of the spring stiffness of the wall of the elastic body which partially defines the pressure-receiving chamber, and the specific gravity of the fluid contained in the fluid chambers.

In the present elastic mount according to the above-described second preferred form of the invention, the first orifice passage is tuned so as to to exhibit a sufficiently low dynamic spring constant with respect to the component of the engine idling vibrations which is lower than the component of the engine idling vibrations to which the second orifice passage is tuned. This arrangement permits the elastic mount to exhibit an effective damping capability with respect to the low-frequency vibrations such as engine shakes during running of the vehicle based on the fluid flows through the first orifice passage.

In a third preferred form of the invention, the third orifice passage has an open end open to the equilibrium chamber, and the first control means comprises pressing means for selectively placing the flexible diaphragm in an open position in which the flexible diaphragm is spaced apart from the open end of the third orifice passage to permit the fluid flows through the third orifice passage, and a closed position in which the flexible diaphragm closes the open end to inhibit the fluid flows through the third orifice passage.

According to this arrangement, the first control means can be made simple in construction without requiring the components thereof incorporated within the equilibrium chamber, to thereby assure a simplified structure and improved production efficiency of the elastic mount.

The pressing means may include motor-driven mechanism for moving the flexible diaphragm toward and away from the open end of the third orifice passage. In one advantageous arrangement of the above third preferred form of the invention, however, the pressing means includes: an abutting member which is disposed on one of the opposite sides of the flexible diaphragm remote from the equilibrium chamber such that the abutting member is displaceable toward and away from the open end of the third orifice passage; biasing means for biasing the abutting member toward the open end of the third orifice passage such that the abutting member forces the flexible diaphragm into the closed position for inhibiting the fluid flows through the third orifice passage; and means for defining an air chamber which is formed on one of the opposite sides of the abutting member remote from the flexible diaphragm and which receives a negative pressure for retracting the abutting member away from the open end of the third orifice passage against a biasing force of the biasing means, so as to place the flexible diaphragm in the open position for permitting the fluid flows through the third orifice passage.

In the fluid-filled elastic mount constructed as described above, it is not required to incorporate, within the body of the mount, any drive means or power transmission mechanism such as a motor for moving the abutting member toward and away from the open end of the third orifice passage. Thus, the pressing means can be made simple in construction and is available at a relatively low cost, leading to reduced weight and size of the elastic mount to be obtained. When the present fluid-filled elastic mount is used as the engine mount incorporated in the power unit of the vehicle which includes the internal combustion engine, the negative pressure to be applied to the air chamber for retracting the abutting member away from the open end of the third orifice passage can be obtained in the intake air system of the internal combustion engine, leading to a simplified structure of the engine mount.

In the fluid-filled elastic mount having the pressing means as described above, the abutting member is elastically supported at the outer peripheral portion thereof by a sealing support rubber so that the abutting member is displaceable under elastic deformation of the sealing support rubber. Further, on one of the opposite sides of the abutting member (i.e., on the side of the flexible diaphragm), there is formed an atmospheric chamber which permits displacement of the flexible diaphragm while, on the other side of the abutting member remote form the flexible diaphragm, the air chamber is formed which receives the negative pressure from an external negative pressure source. When the present elastic mount is used as the engine mount for the vehicle, the air chamber advantageously receives a negative pressure generated in the intake air system of the internal combustion engine of the vehicle. In this case, the sealing support rubber is desirably formed of a material which has a high resistance to gasoline for assuring sufficiently high durability of the sealing support rubber.

In the fluid-filled elastic mount constructed as described above, it is preferable to employ an elastic member in the form of a coil spring, for instance, as the biasing means for biasing the abutting member toward the open end of the third orifice passage. For permitting the elastic mount to exhibit effective damping characteristics based on the respective fluid flows in both of the second and third orifice passages by selectively opening and closing the third orifice passage with high stability by the pressing means, a product Pa of an internal pressure P of the pressure-receiving chamber which arises upon application of the vibrational load to the mount and a cross sectional area a of the open end of the third orifice passage is determined to be smaller than the biasing force of the biasing means which acts on the abutting member. (When the coil spring is used as the biasing means, for instance, the above-described biasing force is represented as a product kx of a spring constant k and a compression amount x of the coil spring measured when the coil spring is disposed in the mount.) In addition, a product pA of a negative pressure p to be applied to the air chamber and an effective surface area A of the abutting member which receives the negative pressure is determined to be larger than a force which acts on the abutting member under a biasing action of the biasing means upon displacement of the abutting member. (When the coil spring is used as the biasing means for instance, the above-described force is represented as a product k(x+x') of the spring constant k and a total compression amount x+x' of the coil spring when the third orifice passage is open for permitting the fluid flows therethrough (wherein, x' is an amount of displacement of the abutting member).

In a fourth preferred form of the invention, the third orifice passage is formed between the movable member and the equilibrium chamber, the first control means comprising: means for defining another equilibrium chamber to which the third orifice passage is open and which is formed independently of the equilibrium chamber to which the first and second orifice passages are open; another flexible diaphragm which partially defines the above-indicated another equilibrium chamber to which the third orifice passage is open; an air chamber formed on one of the opposite sides of the above-indicated another flexible diaphragm remote from another equilibrium chamber for permitting displacement of another flexible diaphragm; and means for defining a first air passage which connects the air chamber to a negative pressure source for drawing another flexible diaphragm to inhibit a change in volume of another equilibrium chamber, to thereby substantially close the third orifice passage.

In the fluid-filled elastic mount constructed as described above, the first control means for selectively permitting and inhibiting the fluid flows through the third orifice passage does not require any members or components for providing drive force or biasing force to be incorporated within the mount body, so that the elastic mount can be made simple in construction and compact in size while assuring improved production efficiency. When the present elastic mount is used as the engine mount for the motor vehicle, it effectively utilizes a negative pressure generated in the intake air system during idling of the vehicle, as the negative pressure to be applied to the air chamber, so as to close the third orifice passage and to accordingly open the second orifice passage for permitting the fluid flows therethrough. Thus, the present elastic mount used as the engine mount stably exhibits excellent damping or isolating characteristics with respect of the engine idling vibrations based on the fluid flows through the second orifice passage.

In the above fourth form of the invention, it may be possible to permit the displacement of the flexible diaphragm to which the third orifice passage is open by forming the air chamber to have sufficiently large volume, or selectively connecting the air chamber to the negative pressure source or the atmosphere. In one advantageous arrangement of the fourth form of the invention, however, the elastic mount further comprise: means for defining a second air passage for substantially connecting the air chamber to an atmosphere; and flow restricting means for restricting an amount of flow of the air into the air chamber, the second air passage allowing air flows into and from the air chamber so as to permit displacement of another flexible diaphragm when the first air passage is not connected to the negative pressure source.

In the fluid-filled elastic mount as described above, even if the first air passage is connected to the negative pressure source via a conduit having a large air flow resistance due to its small cross sectional area, the second air passage allows the air flows into and from the air chamber, so as to permit the volume change of the air chamber, and to accordingly permit the displacement of another flexible diaphragm, whereby the elastic mount is capable of exhibiting effective damping characteristics based on the fluid flows through the third orifice passage.

While the air chamber is connected to the negative pressure source, the flow of the air into the air chamber is restricted by the flow restricting means. In this arrangement, the flexible diaphragm is effectively drawn under vacuum and its deformation is inhibited. The flow restricting means may be in the form of a movable member which is disposed in the second air passage such that it is displaceable or deformable by a predetermined amount, thereby permitting a predetermined amount of substantial air flows between the second air passage and the air chamber, based on the displacement or deformation of the movable member.

When the fluid-filled elastic mount as described above is used as the engine mount for the motor vehicle wherein the first air passage is connected to the negative pressure source through a conduit with a vacuum valve interposed therebetween, for instance, the conduit may have a large air flow resistance due to the existence of the vacuum valve. However, in the present elastic mount, while the air chamber is not connected to the negative pressure source, the second air passage allows the air flows into and from the air chamber, so as to permit the displacement of the above-indicated flexible diaphragm, whereby the present elastic mount is capable of exhibiting effective damping or isolating characteristics based on the fluid flows through the third orifice passage.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which.

DETAILED DESCRIPTION OF THE PREFERRED EMBODIMENTS

Figure 1:
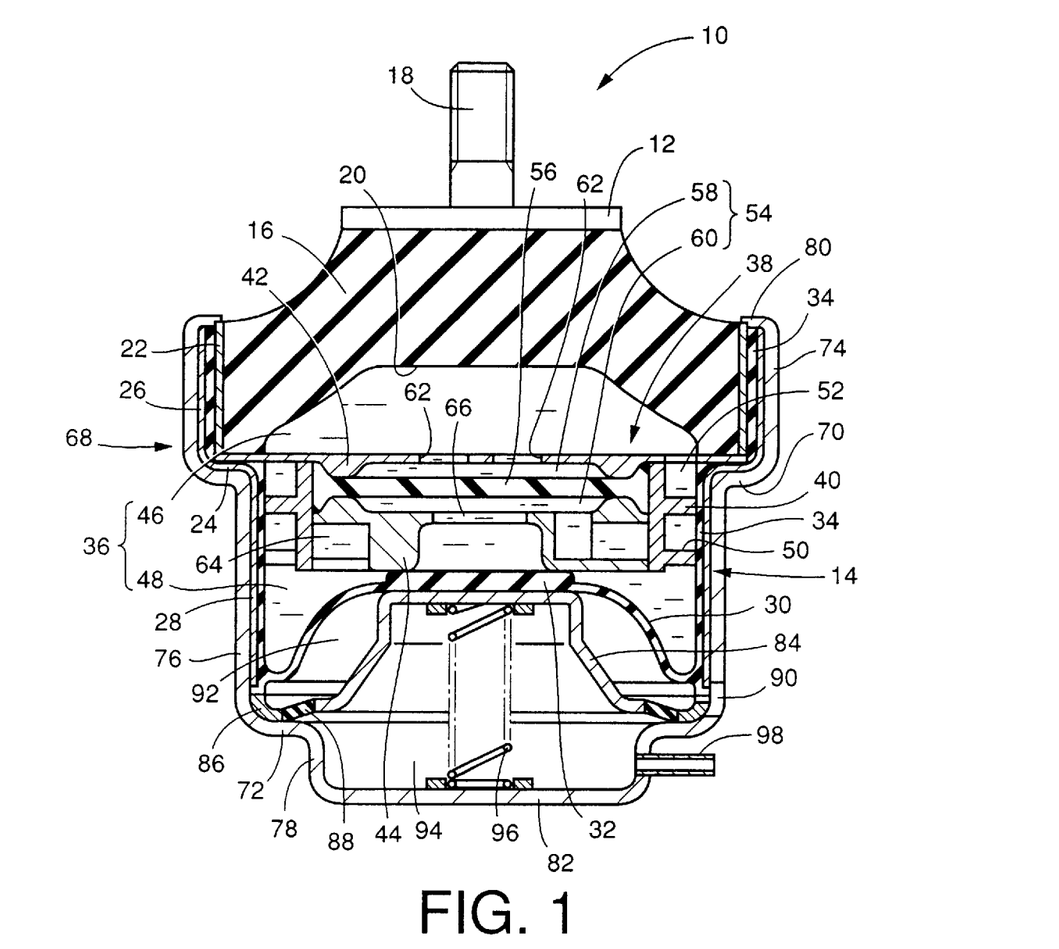
FIG. 1 is an elevational view in longitudinal or axial cross section of an engine mount constructed according to one embodiment of the invention.

Referring first to FIG. 1, there is shown one embodiment of a fluid-filled elastic mount in the form of an engine mount for use on a motor vehicle constructed according to the present invention. The engine mount generally indicated at 10 includes a first mounting member 12 made of a metallic material, a second mounting member 14, and an elastic body 16 which is interposed between the first and second mounting members 10, 12 so as to elastically connect these two mounting members 10, 12. The present engine mount 10 is installed on the motor vehicle such that the first mounting member 10 is attached to one of a power unit and a body of the vehicle while the second mounting member 12 is attached to the other of the power unit and the vehicle body, so that the power unit is mounted on the vehicle via the engine mount 10 in the vibration damping or isolating manner.

When the engine mount 10 is installed on the vehicle as described above, a load or weight of the power unit acts on the elastic body 16, and the elastic body 16 is elastically deformed, whereby the first and second mounting members 10, 12 are displaced toward each other by a suitable amount. The engine mount 10 receives a vibrational load primarily in a direction in which the first and second mounting members 10, 12 are opposed to each other, i.e., in the substantially vertical direction as seen in FIG. 1. This direction will be referred to as "load-receiving direction" where appropriate.

The first mounting member 12 has a generally circular shape. A mounting bolt 18 is secured to the first mounting member 12 so as to protrude from its central portion in the axially upward direction of the engine mount 10. The elastic body 16 has a generally frustconical shape and is formed with a recess 20 which is open in its large-diameter end face. When the elastic body 16 is formed in a vulcanization process, the small-diameter end face of the elastic body 16 is bonded to the lower or inner surface of the first mounting member 12. During the vulcanization process, an intermediate sleeve 22 is bonded to the outer circumferential surface of the large-diameter portion of the elastic body 16.

The second mounting member 14 is a generally cylindrical member having a small thickness. The second mounting member 14 has a shoulder 24 at an axially middle portion thereof, and includes a large-diameter cylindrical portion 26 on the upper side of the shoulder 24, and a small-diameter cylindrical portion 28 on the lower side of the shoulder 24. On the lower open end of the second mounting member 14 on the side of the small-diameter cylindrical portion 28, there is disposed a diaphragm 30, which is a generally thin-walled, flexible rubber layer. The peripheral portion of the diaphragm 30 is bonded by vulcanization to the open end of the small-diameter cylindrical portion 28 of the second mounting member 14, whereby the lower open end of the second mounting member 14 on the side of the small-diameter cylindrical portion 28 is fluid-tightly closed by the diaphragm 30. The radially inner or central portion of the diaphragm 30 has a larger wall thickness than the radially outer portion thereof, so as to provide a disc-like valve portion 32. To the inner circumferential surfaces of the large- and small-diameter cylindrical portions 26, 28, there are respectively bonded by vulcanization thin sealing rubber layers 34.

The thus constructed second mounting member 14 is fitted at its large-diameter cylindrical portion 26 on the intermediate sleeve 22 to which the elastic body 16 is bonded, so that the large-diameter cylindrical portion 26 of the second mounting member 14 is secured to the outer circumferential surface of the intermediate sleeve 22 via the sealing rubber layer 34 by a suitable drawing operation, for instance. Thus, the upper open end of the second mounting member 14 on the side of the large-diameter cylindrical portion 26 is fluid-tightly closed by the elastic body 16. According to this arrangement, the axially opposite open ends of the second mounting member 14 are fluid-tightly closed by the diaphragm 30 and the elastic body 16, respectively, so that the second mounting member 14 cooperate with the diaphragm 30 and the elastic body 16 to define a fluid-tight space 36 filled with a suitable non-compressive fluid such as water, alkylene glycol, polyalkylene glycol or slilicone oil. For effective damping of input vibrations based on resonance of the fluid, it is desirable to fill the fluid-tight space 36 with a low-viscosity fluid whose viscosity is not higher than 0.1 Pa·s.

Within the fluid-tight space 36 as described above, there is disposed a partition structure 38 which is a generally disc member with a large thickness (height dimension in the axial direction of the engine mount 10). The partition structure 38 is fixedly positioned with respect to the second mounting member 14 such that it is disposed at an axially middle portion of the fluid-tight space 36 so as to divide the space 36 into two sections on the axially opposite sides thereof. The partition structure 38 consists of a generally cylindrical first partition member 40, a generally circular second partition member 42 which is disposed on the upper end face of the first partition member 40, and a generally annular third partition member 44 which is fitted in a lower end portion of the first partition member 40. The thus constructed partition structure 38 is fixed to the second mounting member 14, such that the first partition member 40 is fitted in the small-diameter portion 28 of the second mounting member 14 so as to be held in abutting contact with the inner circumferential surface of the small-diameter portion 28 via the sealing layer 34, and such that the outer peripheral portion of the second partition member 42 is superposed on the shoulder 24 of the second mounting member 14 and gripped by and between the shoulder 24 and the lower end of the intermediate sleeve 22.

The partition structure 38 divides the fluid-tight space 36 into the two sections as described above, i.e., a pressure-receiving chamber 46 formed on the upper side thereof as seen in FIG. 1 and partially defined by the elastic body 16, and an equilibrium chamber 48 formed on the lower side as seen in FIG. 1 and partially defined by the diaphragm 30. Upon application of a vibrational load to the engine mount 10, the pressure in the pressure-receiving chamber 46 changes due to the elastic deformation of the elastic body 16, while the volume of the equilibrium chamber 48 is permitted to vary by displacement of the diaphragm 30.

The partition structure 38 has a spiral groove 50 spirally formed in the outer circumferential surface of the first partition member 40. This spiral groove 50 is closed by the small-diameter cylindrical portion 28 of the second mounting member 14, so as to provide a first orifice passage 52 for permitting fluid communication therethrough between the pressure-receiving and equilibrium chambers 46, 48 based on a pressure difference therebetween upon application of the vibrational load to the engine mount 10.

The first partition member 40 of the partition structure 38 has a center bore which is substantially closed by the second and third partition members 42, 44, to thereby define an inner cavity 54. Within this inner cavity 54, there is provided a movable member in the form of a rubber plate 56. The outer peripheral portion of the rubber plate 56 is fluid-tightly gripped by and between the second and third partition members 42, 44, so that the rubber plate 56 divides the inner cavity 54 into an upper space 58 on the side of the second partition member 42 and a lower space 60 on the side of the third partition member 44. The central portion of the rubber plate 56 is elastically deformable or displaceable in the load-receiving direction of the engine mount 10. The maximum amount of deformation or displacement of the rubber plate 56 is determined by the abutting contacts of the upper and lower surfaces of the rubber plate 56 with the respective second and third partition members 42, 44. The second partition member 42 which cooperates with the rubber plate 56 to define the upper space 58 has communication holes 62 for fluid communication between the upper space 58 and the pressure-receiving chamber 46. The fluid pressure in the pressure-receiving chamber 46 acts on the upper surface of the movable rubber plate 56 through the communication holes 62. The third partition member 44 which cooperates with the rubber plate 56 to define the lower space 60 is formed with a second orifice passage 64 which extends in the outer circumferential surface thereof, so as to permit fluid communication therethrough between the lower space 60 of the inner cavity 54 and the equilibrium chamber 48. The third partition member 44 further has a third orifice passage 66 which is formed through its central portion for permitting fluid communication between the lower space 60 of the inner cavity 54 and the equilibrium chamber 48. The second and third orifice passages 64 and 66 are formed in parallel with each other. The pressure change generated in the pressure-receiving chamber 46 upon application of the vibrational load to the engine mount 10 is transmitted to the upper space 58 through the communication holes 62, so that the rubber plate 56 is elastically deformed, whereby the fluid is forced to flow between the lower space 60 and the equilibrium chamber 48 through the second orifice passage 64 or the third orifice passage 66, by an amount corresponding to the amount of elastic deformation of the rubber plate 56.

In the present embodiment, the second orifice passage 64 has a larger ratio A/L than the first orifice passage 52, wherein "A" and "L" represent a cross sectional area and length of each orifice 52, 64, respectively. That is, the second orifice passage 64 is tuned to a frequency range higher than a frequency range to which the first orifice passage 54 is tuned. Further, the third orifice passage 66 has a larger ratio A/L than the second orifice passage 52, so that the third orifice passage 66 is tuned to a frequency range higher than the frequency range to which the second orifice passage 52 is tuned. Described in detail, the third orifice passage 66 is tuned so that the engine mount 10 exhibits a low dynamic spring constant with respect to high-frequency vibrations such as booming noises, on the basis of resonance of the fluid which is forced to flow through the third orifice passage 66. The second orifice passage 64 is tuned so that the engine mount 10 exhibits a low dynamic spring constant with respect to a second-order component of engine idling vibrations (medium-frequency vibrations) whose vibration level is the highest among different components of the idling vibrations, based on resonance of the fluid which is forced to flow through the second orifice passage 64. The first orifice passage 52 is tuned so that the engine mount 10 exhibits a low dynamic spring constant with respect to a first-order component of the engine idling vibrations (relatively low-frequency engine idling vibrations) whose vibration level is the second highest, as well as damping effects with respect to low-frequency vibrations such as engine shakes.

On the outer circumferential surface of the second mounting member 14, there is fitted a bracket 68 through which the second mounting member 14 is attached to the vehicle body (not shown) via a mounting stay (not shown) formed on the bracket 68.

The bracket 68 is a generally cylindrical member which is open at its upper axial end and which is closed at its lower axial end. The bracket 68 has two shoulders, i.e., an upper shoulder 70 and a lower shoulder 72. The two shoulders divide the cylindrical portion of the bracket 68 into three sections, i.e., an upper cylindrical portion 74 having the largest diameter, an intermediate cylindrical portion 76 having the second largest diameter, and a lower cylindrical portion 78 having the smallest diameter. The bracket 68 further has a calking part 80 formed at an open end of the upper cylindrical portion 74. The bracket 68 is fitted on the second mounting member 14 in the axial direction from the small-diameter portion 28 of the second mounting member 14 toward the large-diameter portion 26, so that the upper and intermediate cylindrical portions 74, 76 of the bracket 68 are fitted on the large-diameter and small-diameter portions 26, 28 of the second mounting member 14, respectively. In this arrangement, the large-diameter portion 26 of the second mounting member 14 and the intermediate sleeve 22 are accommodated in the upper cylindrical portion 74 of the bracket 68 and are axially gripped by and between the calking part 80 and the upper shoulder 70 of the bracket 68, whereby the bracket 68 is fixedly attached to the second mounting member 14 so as to surround its outer circumferential surface.

The bracket 68 has a bottom wall 82 which cooperates with the diaphragm 30 to define an enclosed space having a suitable volume at the bottom of the bracket 68. Within this space, there is accommodated an abutting plate in the form of an abutting metal member 84. The abutting member 84 is a generally inverted-cup-shaped member having a flat, circular top wall and a cylindrical wall portion whose diameter increases toward its open end. The peripheral portion at the open end of the abutting member 84 is elastically connected to and supported by a fixing ring 86 which is disposed radially outwardly of the abutting member 84, with an annular sealing support rubber 88 interposed therebetween. The fixing ring 86 is air-tightly press-fitted in the outer circumferential portion of the lower shoulder 72 of the bracket 68. Accordingly, the abutting member 84 is disposed in the space defined by and between the diaphragm 30 and the bottom wall 82 of the bracket 68, such that the abutting member 84 is displaceable in the axial directions toward and away from the partition structure 38, under elastic deformation of the sealing support rubber 88. The enclosed space defined by and between the diaphragm 30 and the bottom wall 82 of the bracket 68 is air-tightly divided by the abutting member 84 into an atmospheric chamber 92 and an air chamber 94, which are located on the opposite sides of the abutting member 84. That is, the atmospheric chamber 92 formed on the side of the diaphragm 30 is brought into communication with the atmosphere through a communication hole 90 formed through the thickness of the intermediate-cylindrical portion 76 of the bracket 68, so as to permit displacement or deformation of the diaphragm 30. The air chamber 94 formed on the side of the bottom wall 82 of the bracket 68 is inhibited from communicating with the atmosphere.

Within the air chamber 94, there is accommodated biasing means in the form of a coil spring 96. The coil spring 96 is disposed in a compressed state between the abutting member 84 and the bottom wall 82 of the bracket 68. In this arrangement, the coil spring 96 upwardly biases the abutting member 84 such that the abutting member 84 forces the valve portion 32 of the diaphragm 30 onto the central portion of the lower surface of the partition structure 38. Accordingly, the open end of the third orifice passage 66 on the side of the equilibrium chamber 48 is fluid-tightly closed by the valve portion 32 of the diaphragm 30, thereby inhibiting the fluid communication through the third orifice passage.

Figure 2:
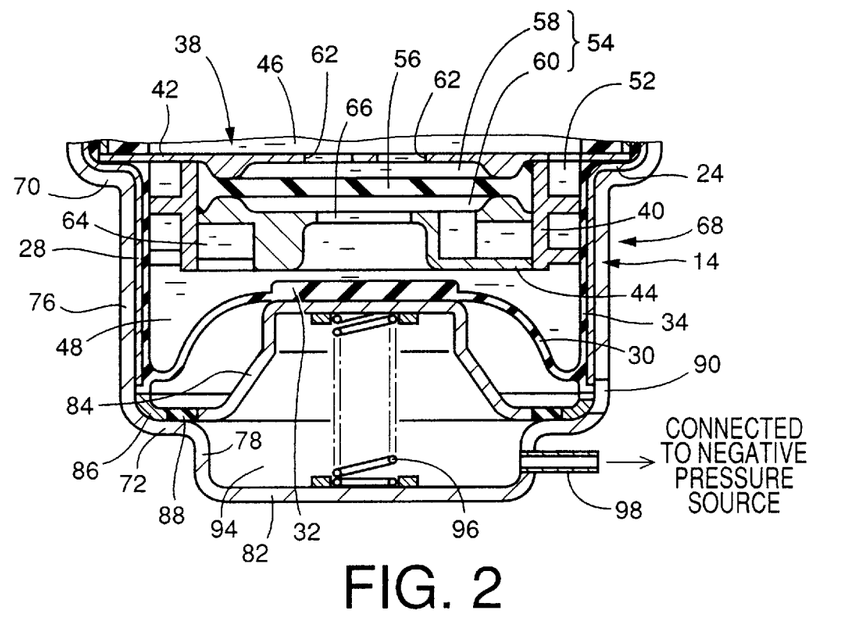
FIG. 2 is a fragmentary view in longitudinal cross section showing a principal part of the engine mount of FIG. 1, in an operating state different from that of FIG. 1.

To the lower cylindrical portion 78 of the bracket 68, there is fixed a connecting pipe 98 which extends through the thickness of the lower cylindrical portion 78. The connecting pipe 98 is connected to an air conduit, which is in turn connected to a suitable negative pressure source not shown. According to this arrangement, the air chamber 94 is selectively connected to and disconnected from the negative pressure source. When the negative pressure is applied to the air chamber 94 through the connecting pipe 98, the abutting member 84 is retracted downward by suction of the negative pressure against the biasing force of the coil spring 96, under elastic deformation of the sealing support rubber 88, to thereby release the valve portion 32 of the diaphragm 30 from the open end of the third orifice passage 66 formed in the partition structure 38. Thus, the open end of the third orifice passage 66 is open to the equilibrium chamber 48, to thereby permitting the fluid flows through the third orifice passage 66. In the present embodiment, the abutting member 84, coil spring 96 and air chamber 94 cooperate with each other to constitute pressing means which controls the operating state of the third orifice passage 66 by pressing or retracting the diaphragm 30 toward and away from the open end of the third orifice passage 66.

Figure 3:
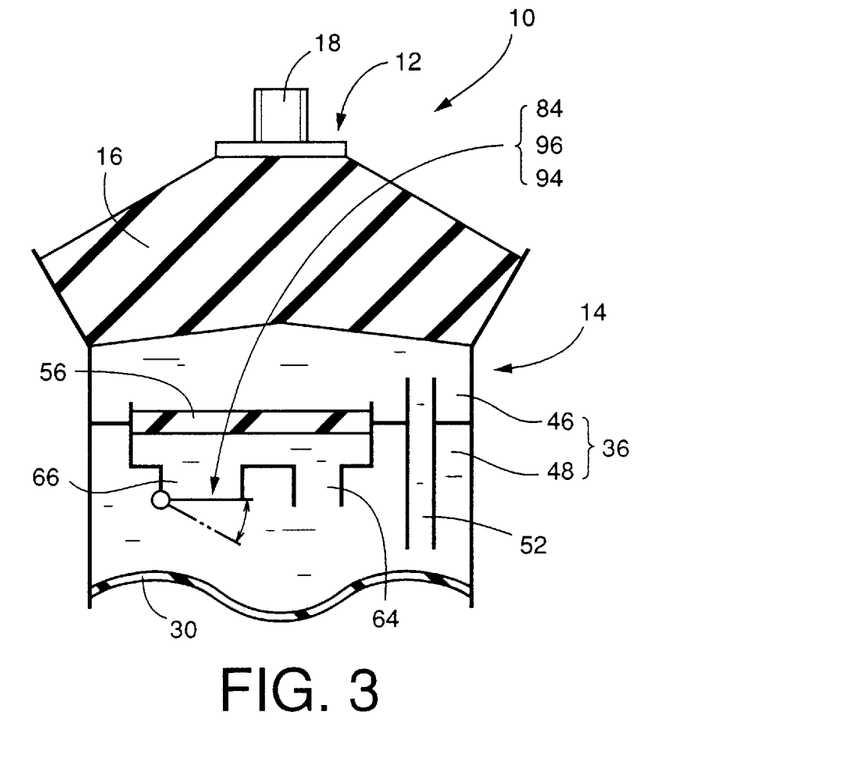
FIG. 3 is a view schematically showing the engine mount of FIG. 1.

As schematically shown in FIG. 3, in the engine mount 10 constructed according to the present embodiment, the third orifice passage 66 is selectively opened and closed by selectively connecting and disconnecting the negative pressure source to and from the air chamber 94. When the third orifice passage 66 is open, the fluid is forced to flow through the third orifice passage 66 by an amount which substantially corresponds to the amount of elastic deformation of the rubber plate 56, based on the pressure difference between the pressure-receiving and equilibrium chambers 46, 48 caused upon application of the vibrational load to the engine mount 10, since the third orifice passage 66 has a lower fluid flow resistance than the second orifice passage 64. At the same time, the amount of the fluid flowing through the third orifice passage 66 is restricted by the elasticity of the rubber plate 56 or abutment of the rubber plate 56 with the second and third partition members 42, 44 of the partition structure 38 which define the inner cavity 54. Accordingly, the fluid is forced to flow through the first orifice passage 52 on the basis of the pressure difference between the pressure-receiving and equilibrium chambers 46, 48, which pressure difference can not be absorbed by the elastic deformation of the rubber plate 56.

According to the present embodiment, when the third orifice passage 66 is open for permitting the fluid communication therethrough, the engine mount 10 exhibits damping effects with respect to the low-frequency vibrations such as engine shakes owing to the fluid flows through the first orifice passage 52 while it exhibits isolating effects with respect to the high-frequency vibrations such as booming noises owing to the fluid flows through the third orifice passage 66.

On the other hand, when the third orifice passage 66 is closed for inhibiting the fluid communication therethrough, the fluid is forced to flow through the second orifice passage 64 by the amount substantially corresponding to the amount of elastic deformation of the rubber plate 56, based on the pressure difference between the pressure-receiving and equilibrium chambers 46, 48, which pressure difference is caused upon application of the vibrational load to the engine mount 10, while, at the same time, the fluid is forced to flow through the first orifice passage 52 based on the pressure difference between the two chambers 46, 48, which pressure difference can not be absorbed by the elastic deformation of the rubber plate 56.

Accordingly, when the third orifice passage 66 is closed to inhibit the fluid communication therethrough, the engine mount 10 exhibits damping or isolating effects with respect to the second-order component idling vibrations (medium-frequency vibrations) based on the fluid flows through the second orifice passage 64, while it exhibits effective damping or isolating effects with respect to the first-order component idling vibrations (low-frequency idling vibrations) based on the fluid flows through the first orifice passage 52. Thus, the present engine mount 10 is capable of exhibiting excellent damping or isolating characteristics with respect to the engine idling vibrations.

In the engine mount 10 constructed as described above according to the present invention, the fluid is forced to flow through the selected one of the second orifice passage 64 and the third orifice passage 66 while the first orifice passage 52 is always kept to be operative for permitting the fluid flows therethrough. Thus, by controlling the third orifice passage 66 to be operative during running of the vehicle, the present engine mount 10 is capable of exhibiting effective damping and isolating effects with respect to the low-frequency vibrations such as engine shakes and the high-frequency vibrations such as booming noises generated during running of the vehicle. Further, by disabling the third orifice passage 66 for inhibiting the fluid communication therethrough while the vehicle is in a stop with the engine placed in its idling state, the engine mount 10 is capable of exhibiting excellent damping or isolating effects with respect to the engine idling vibrations applied thereto during the idling of the vehicle.

In the present engine mount 10, the third orifice passage 66 is closed for inhibiting the fluid communication therethrough by pressing the diaphragm 30 onto the open end of the third orifice passage 66. Thus, it is not required to dispose a switching member or drive means for selectively controlling the third orifice passage 66 to be operative and inoperative, within the pressure-receiving chamber 46 or the equilibrium chamber 48, thereby permitting the simplified construction and excellent production efficiency of the engine mount 10. Further, the diaphragm 30 is pressed onto the open end of the third orifice passage 66 by the biasing force of the coil spring 96, and retracted away from the open end by the suction force based on the negative pressure applied from the external negative pressure source. Accordingly, the present engine mount 10 assures significantly simplified construction and improved production efficiency, without incorporating any drive means or power transmission mechanism such as an electric motor, within the body of the engine mount 10.

Figure 4:
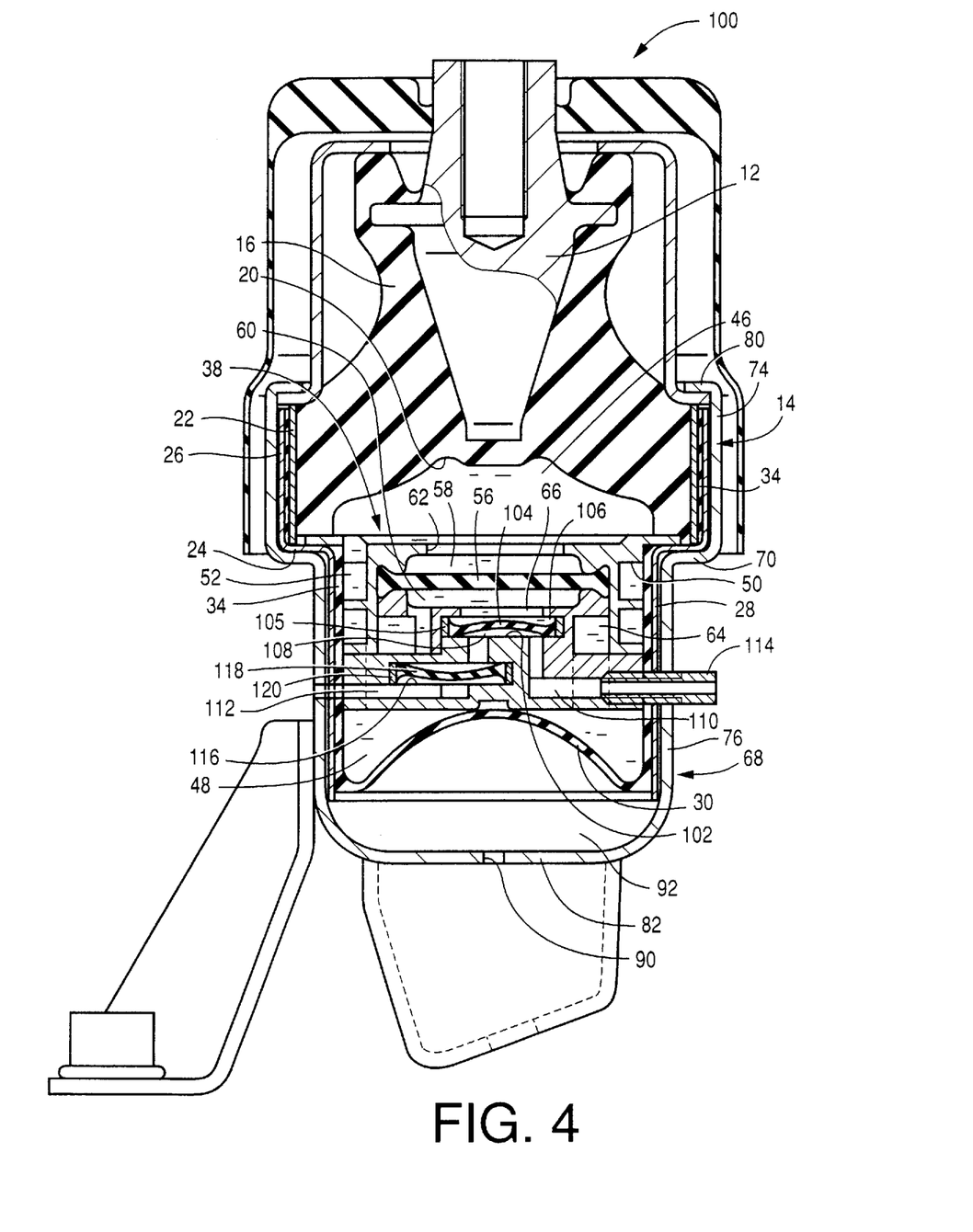
FIG. 4 is an elevational view in longitudinal or axial cross section of an engine mount constructed according to another embodiment of the invention.

Referring next to FIG. 4, there is shown an engine mount 100 constructed according to a second embodiment of the present invention. The engine mount 100 has control means for selectively permitting or inhibiting the fluid flows through the third orifice passage 66, which means is different from that of the engine mount 10 of the above-described first embodiment. In this second embodiment, the same reference numerals as used in the first embodiment are used to identify the corresponding components and detailed description of which is dispensed with. In the engine mount 100 according to the second embodiment, the diaphragm 30 and the equilibrium chamber 48 are referred to as "first diaphragm 30" and "First equilibrium chamber 48", respectively.

In the engine mount 100 of the second embodiment, the partition structure 38 has a circular central space 102 formed at the substantially central portion thereof. In this central space 102, there is accommodated a second diaphragm 104, which is a circular thin-walled flexible layer. The second diaphragm 104 is accommodated within the central space 102 such that a fixing ring 105 secured by vulcanization to the outer peripheral portion of the second diaphragm 104 is fluid-tightly fitted in the central space 102. Thus, the central space 102 is fluid-tightly divided into two sections by the second diaphragm 104, which are located on the axially opposite sides of the the second diaphragm 104.

Described more specifically, on the upper side of the second diaphragm 104, there is formed a second equilibrium chamber 106 to which the third orifice passage 66 is open and whose volume is variable due to elastic deformation of the second diaphragm 104 so as to permit a substantial flow of the fluid between the pressure-receiving chamber 46 and the second equilibrium chamber 106 through the third orifice passage 66, based on the elastic deformation of the rubber plate 56. The second diaphragm 104 which partially defines the second equilibrium chamber 106 is formed separately from or independently of the first diaphragm 30 which partially defines the first equilibrium chamber 48 to which the first and second orifice passages 52, 64 are open.

On the lower side of the second diaphragm 104 in the central space 102, there is formed an air chamber 108 which permits the elastic deformation of the second diaphragm 104. As shown in FIG. 4, the partition structure 38 is further formed with a first air passage 110 and a second air passage 112, each of which is brought into communication with the air chamber 108 at the radially inner end thereof. The second air passage 112 is formed through the cylindrical walls of the second mounting member 14 and the bracket 68, so as to communicate with the exterior space at the radially outer end thereof. To the radially outer open end of the first air passage 110, there is secured a connecting pipe 114, which is in turn connected to an external air conduit.

At the middle portion of the second air passage 112, there is formed a circular hollow space 116 in which a circular thin-walled flexible rubber layer 118 is accommodated. This flexible rubber layer 118 is accommodated within the hollow space 116 such that a fixing ring 120 secured by vulcanization to the outer peripheral portion of the rubber layer 118 is air-tightly fitted in the hollow space 116. According to this arrangement, the second air passage 112 is air-tightly divided by the flexible rubber layer 118 disposed in the hollow space 116 into two sections, i.e., an upper portion which is held in communication with the air chamber 108 and a lower portion which is held in communication with the atmosphere.

In the engine mount 100 constructed according to the second embodiment, when the first air passage 110 is not connected to the negative pressure source as shown in FIG. 4, the second air passage 112 allows air flows into and from the air chamber 108 based on the elastic deformation of the flexible rubber layer 118, so as to permit displacement or deformation of the second diaphragm 104, and accordingly permit a change in volume of the second equilibrium chamber 106. Upon application of the vibrational load to the engine mount 100, therefore, the fluid is forced to flow between the lower space 60 of the inner cavity 54 and the second equilibrium chamber 106 through the third orifice passage 66, based on the elastic deformation of the rubber plate 56, whereby the present engine mount 100 provides effective damping or isolating effects as described in the first embodiment on the basis of the fluid flows through the third orifice passage 66.

Figure 5:
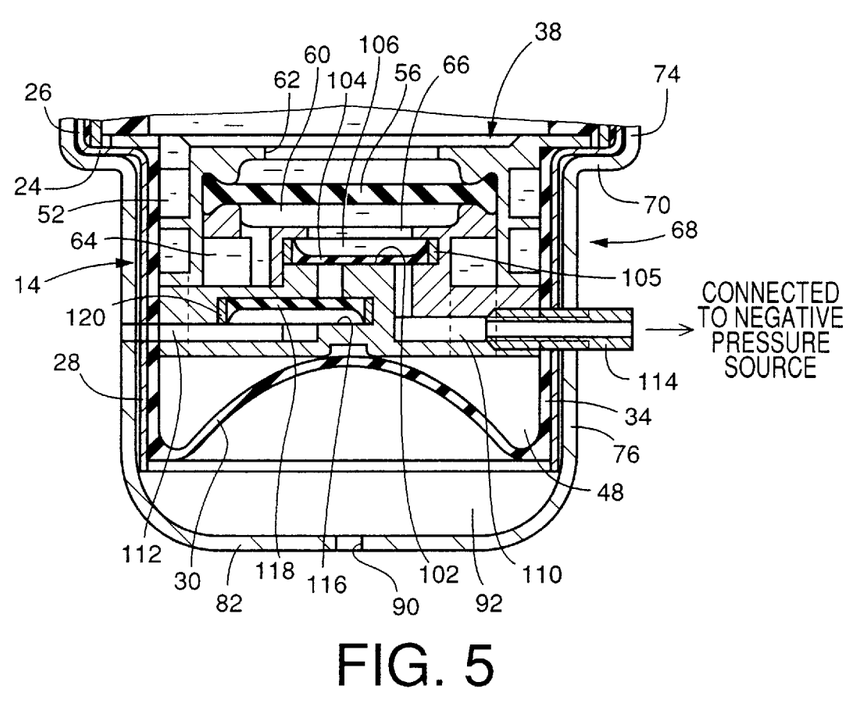
FIG. 5 is a fragmentary view in longitudinal cross section showing a principal part of the engine mount of FIG. 4.

On the other hand, when the first air passage 110 is connected to the negative pressure source as shown in FIG. 5, the second diaphragm 104 is drawn onto the partition structure 38 by the negative pressure applied through the first air passage 110. Thus, the second diaphragm 104 which is kept drawn is prevented from deforming, so as to inhibit the volume change of the second equilibrium chamber 106. In this condition, the fluid flow is caused neither in the second equilibrium chamber 106 nor in the third orifice passage 66, to thereby substantially close the third orifice passage 66. When the vibrational load is applied to the engine mount 100 with the third orifice passage 66 placed in the closed state as described above, the fluid is forced to flow through the second orifice passage 64 for fluid communication between the lower space 60 of the inner cavity 54 and the equilibrium chamber 48, based on the elastic deformation of the rubber plate 56. Accordingly, the engine mount 100 is capable of exhibiting effective damping or isolating effects as described with respect to the first embodiment.

While the first air passage 110 is connected to the negative pressure source, the second air passage 112 is subjected to the negative pressure applied through the first air passage 110 via the air chamber 108, so that the flexible rubber layer 118 is drawn onto the partition structure 38 by the applied negative pressure. Thus, the flexible rubber layer 118 which is kept drawn is inhibited from deforming to inhibit the air flow into the air chamber 108 which would be otherwise caused by the elastic deformation of the flexible rubber layer 118. According to this arrangement, the second diaphragm 104 is effectively kept drawn by the negative pressure as long as the first air passage 110 is connected to the negative pressure source.

In the engine mount 100 constructed according to the second embodiment of the present invention, the third orifice passage 66 is selectively controlled to be inoperative and operative for substantially inhibiting and permitting the fluid flows therethrough, by selectively connecting or disconnecting the air chamber 108 to and from the negative pressure source via the first air passage 110. Thus, as in the engine mount 10 of the first embodiment, the present engine mount 100 is capable of providing effective damping and isolating effects with respect to the vibrations applied thereto during running of the vehicle based on the fluid flows through the first and third orifice passages 52, 66, as well as effective damping or isolating effects with respect to the vibrations applied thereto while the vehicle is in a stop with the engine in the idling state based on the fluid flows through the first and second orifice passages 52, 64.

The present engine mount 100 exhibits excellent damping or isolating characteristics with respect to the vibrations applied thereto while the vehicle is in a stop with the engine in the idling state, based on the fluid flows through the first and second orifice passages 52, 64, by application of the negative pressure to the air chamber 108 as described above. Accordingly, by utilizing a negative pressure obtained with high stability in the intake air system of the internal combustion engine of the vehicle while the vehicle is in a stop with the engine placed in its idling state, the damping or isolating characteristics of the engine mount 100 can be changed as desired, without requiring any exclusive device such as a vacuum tank for applying the negative pressure to the engine mount 100.

The engine mount 100 of the second embodiment has the second air passage 112 which allows the air flows into and from the air chamber 108 based on the elastic deformation of the flexible rubber layer 118. In this arrangement, even if the first air passage 110 is connected to the intake air system of the vehicle having a large air flow resistance due to provision of a vacuum switch valve therein, for instance, the second air passage 112 readily allows the air flows into and from the air chamber 108 while the first air passage 110 is disconnected from the negative pressure source, to thereby easily deform the second diaphragm 104 for enabling the third orifice passage 66 to function with high stability. Thus, the engine mount 100 is capable of stably and effectively exhibiting excellent damping or isolating characteristics based on the fluid flows through the third orifice passage 66.

While the present invention has been described in its presently preferred embodiments, it is to be understood that the invention is not limited to the details of the illustrated embodiments, but may be otherwise embodied.

For instance, the configurations and structures of the first, second and third orifice passages are not limited to those of the illustrated embodiments, but may be suitably modified as needed depending on the required damping characteristics of the fluid-filled elastic mount.

In the illustrated first embodiment, the second and third orifice passages 64, 66 are formed between the rubber plate 56 as the movable member and the equilibrium chamber 48 while, in the second embodiment, the second and third orifice passages 64, 66 are formed between the rubber plate 56 and the equilibrium chambers 48, 106. These second and third orifice passages may be formed between the rubber plate 56 and the pressure-receiving chamber 46 for permitting fluid communication therethrough between the upper space 58 partially defined by the rubber plate 56 and the pressure-receiving chamber 46.

The configuration and structure of the first control means are not limited to those of the illustrated embodiments, but may be otherwise embodied as long as it is capable of selectively controlling the third orifice passage to be substantially operative and inoperative for selectively permitting and inhibiting the fluid flows through the third orifice passage. For instance, the first control means may be provided with a suitable valve which is controlled by suitable drive means, so as to open or close the third orifice passage.

In addition to the first control means as described in the illustrated embodiments, the fluid-filled elastic mount may have second control means adapted to inhibit the fluid flows through the second orifice passage while the third orifice passage is open, and to permit the fluid flows through the second orifice passage while the third orifice passage is closed.

The configurations and structures of the first and second mounting members are not limited to those of the illustrated embodiments, but may be suitably determined depending upon the components to which the first and second mounting members are fixed.

While the illustrated embodiments of the present invention take the form of a fluid-filled engine mount for an automotive vehicle, the principle of the invention is also applicable to other types of fluid-filled elastic mount, such as a body mount or differential mount for an automotive vehicle, or various mounts used for equipment or devices other than a motor vehicle.

It is to be understood that the present invention may be embodied with various other changes, modifications and improvements, which may occur to those skilled in the art, without departing from the spirit and scope of the invention defined in the following claims.

What is claimed is:

1. A fluid-filled elastic mount comprising:

a first and a second mounting member which are spaced apart from each other;

an elastic body elastically connecting said first and second mounting members and partially defining a pressure-receiving chamber which receives an input vibrational load and which is filled with a non-compressible fluid;

a flexible diaphragm which partially defines an equilibrium chamber filled with said fluid, said flexible diaphragm being displaceable to permit a change in volume of said equilibrium chamber;

means for defining a first orifice passage for effecting fluid communication between said pressure-receiving and equilibrium chambers, said first orifice passage being tuned to a first frequency range;

a movable member disposed between said pressure-receiving and said equilibrium chambers, said movable member being displaceable or deformable so as to permit relative volume changes of said pressure-receiving and said equilibrium chambers;

means for defining a second orifice passage and a third orifice passage formed between said movable member and one of said pressure-receiving and said equilibrium chambers for permitting fluid flows therethrough based on displacement or deformation of said movable member, said second orifice passage being tuned to a second frequency range which is higher than said first frequency range while said third orifice passage is tuned to a third frequency range which is higher than said second frequency range; and first control means for permitting or inhibiting the fluid flows through said third orifice passage.

2. A fluid-filled elastic mount according to claim 1 further comprising second control means for inhibiting fluid flows through said second orifice passage when said first control means permits the fluid flows through said third orifice passage, while said second control means permits the fluid flows through said second orifice passage when said first control means inhibits the fluid flows through said third orifice passage.

3. A fluid-filled elastic mount according to claim 1, wherein said first and second mounting members are fixed to one and the other of a power unit of a motor vehicle including an internal combustion engine and a support member of said vehicle such that said power unit is supported by said support member via said elastic mount in a vibration damping manner, said second and first orifice passages being tuned to damp respective different components of engine idling vibrations of said power unit, such that a component of said engine idling vibrations whose vibration level is the highest is damped by the fluid flows through said second orifice passage and such that another component of said engine idling vibrations whose vibration level is smaller than that of said component of said engine idling vibrations damped by the fluid flows through said second orifice passage is damped by the fluid flows through said first orifice passage.

4. A fluid-filled elastic mount according to claim 1, wherein said flexible diaphragm partially defines an atmospheric chamber connected to an atmosphere for permitting displacement of said flexible diaphragm.

5. A fluid-filled elastic mount according to claim 1, wherein said means for defining said first, second and third orifice passages comprises a partition structure which at least partially defines said first, second and third orifice passages.

6. A fluid-filled elastic mount according to claim 1, wherein said partition structure is formed with an inner cavity in which said movable member is accommodated.

7. A fluid-filled elastic mount according to claim 1, wherein said third orifice passage has an open end open to said equilibrium chamber, and said first control means comprises pressing means for selectively placing said flexible diaphragm in an open position in which said flexible diaphragm is spaced apart from said open end of said third orifice passage to permit the fluid flows through said third orifice passage, and a closed position in which said flexible diaphragm closes said open end to inhibit the fluid flows through said third orifice passage.

8. A fluid-filled elastic mount according to claim 1, wherein said pressing means includes: an abutting member which is disposed on one of the opposite sides of said flexible diaphragm remote from said equilibrium chamber such that said abutting member is displaceable toward and away from said open end of said third orifice passage; biasing means for biasing said abutting member toward said open end of said third orifice passage such that said abutting member forces said flexible diaphragm into said closed position for inhibiting the fluid flows through said third orifice passage; and means for defining an air chamber which is formed on one of the opposite sides of said abutting member remote from said flexible diaphragm and which receives a negative pressure for retracting said abutting member away from said open end of said third orifice passage against a biasing force of said biasing means, so as to place said flexible diaphragm in said open position for permitting the fluid flows through said third orifice passage.

9. A fluid-filled elastic mount according to claim 1, wherein said pressing means further includes a connecting pipe through which said negative pressure is applied to said air chamber.

10. A fluid-filled elastic mount according to claim 1, wherein said abutting member is elastically connected to and supported by a sealing support rubber at an outer peripheral portion thereof, so that said abutting member is displaceable toward and away from said open end of said third orifice passage based on elastic deformation of said sealing support rubber.

11. A fluid-filled elastic mount according to claim 1, wherein said third orifice passage is formed between said movable member and said equilibrium chamber, said first control means comprising: means for defining another equilibrium chamber to which said third orifice passage is open and which is formed independently of said equilibrium chamber to which said first and second orifice passages are open; another flexible diaphragm which partially defines said another equilibrium chamber to which said third orifice passage is open; an air chamber formed on one of the opposite sides of said another flexible diaphragm remote from said another equilibrium chamber for permitting displacement of said another flexible diaphragm; and means for defining a first air passage which connects said air chamber to a negative pressure source for drawing said another flexible diaphragm to inhibit a change in volume of said another equilibrium chamber, to thereby substantially close said third orifice passage.

12. A fluid-filled elastic mount according to claim 11, wherein said first control means further comprises a connecting pipe through which said air chamber is connected to said negative pressure source via said first air passage.

13. A fluid-filled elastic mount according to claim 11, wherein said means for defining said first, second and third orifice passages comprises a partition structure which at least defines said first, second and third orifice passages, said partition structure being formed with a central space in which said another diaphragm is accommodated, so as to divide said central space into said another equilibrium chamber and said air chamber.

14. A fluid-filled elastic mount according to claim 11 further comprising: means for defining a second air passage for substantially connecting said air chamber to an atmosphere; and flow restricting means for restricting an amount of flow of the air into said air chamber, said second air passage allowing air flows into and from said air chamber so as to permit displacement of said another flexible diaphragm when said first air passage is not connected to said negative pressure source.

15. A fluid-filled elastic mount according to claim 11, wherein said second air passage has a hollow space in which said flow restricting means is accommodated.

* * * * *